Patented Jan. 15, 1929.

1,699,432

UNITED STATES PATENT OFFICE.

RICHARD HERZ, OF FRANKFORT-ON-THE-MAIN, GERMANY, ASSIGNOR TO GRASSELLI DYESTUFF CORPORATION, OF NEW YORK, N. Y., A CORPORATION OF DELAWARE.

CONDENSATION PRODUCTS FROM REACTION PRODUCTS OF SULPHUR DICHLORIDE AND PRIMARY ARYLAMINES.

No Drawing. Original application filed May 19, 1927, Serial No. 192,780, and in Germany April 11, 1914. Divided and this application filed May 16, 1928. Serial No. 278,330.

This application is a division of my divisional application Ser. No. 192,780, filed May 19, 1927.

The subject matter of my invention is a series of new and very varied aromatic substances containing nitrogen, sulphur and chlorine. They are formed by the action of disulphurdichloride ($S_2Cl_2$) on primary arylamines and substitution products thereof, which contain in their molecule at least one amino group and one unsubstituted hydrogen in ortho-position thereto. The new reaction is generally applicable to aniline and its homologues, to α- and β- naphthylamine, to aminophenols, to aminoarylhydroxyalkyl- and aminoarylthioalkylethers, to m- and p-aryldiamines, such as m- and p-phenylendiamine, benzidine, tolidine, dianisidine and the acidyl-derivatives of these bases and also to the substitution products of all these arylamino-compounds, including the sulfonic and carboxylic acids.

The reaction runs probably in such a way, that the S—S—Cl group enters in the ortho-position to the amino-group, or amino-groups, respectively, forming with same a new ring, consisting of N, $S_2$ and Cl; in some cases besides the formation of this peculiar new ring, a chlorination of the aromatic nucleus takes place. The new substances possessing probably the following general chemical constitution:

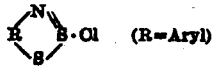   (R=Aryl)

are very useful raw materials for the production of valuable dyestuff and pharmaceutical compounds and are intended to be used as such. They are in a dry state yellow to orange, to red to brown, to dark colored substances soluble with their own color in water and alcohol, and are distinguished by the following characteristic properties:

(1) When brought into contact with aromatic bases such as aniline, toluidine, etc., most of them yielded red to violet, to blue to green colorings, which, as I have ascertained, represent unstable basic dyestuffs containing sulphur.

(2) They react with water by splitting off hydrochloric acid and forming new ring compounds of probably the following general constitution:

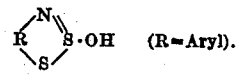   (R=Aryl).

(3) If the original substances or these latter products of transformation are treated in a suitable manner with alkalies, the ring is split and new compounds result which when condensed in an alkaline solution with monochloracetic acid form new condensation products having the character of o-aminoarylthioglycolic acids.

These latter reactions form together with the converting of these condensation products into new and valuable vat dyestuffs the subject matter of my U. S. Patents Nos. 1,243,170 and 1,243,171.

In carrying out the new process in practice, I may start either from the free amino-compounds or from their dry salts (preferably mineral acid salts) or from the acidyl-compounds.

I prefer to employ generally the dry salts (aminosulfonic or aminocarboxylic acids excepted) because the reaction runs more smoothly with these than with the free bases. When these latter compounds or their acidyl-derivatives are used, the first phase of the reaction is always the formation of the hydrochloride of the base employed.

Further on the process may be worked with or without the addition of a suitable diluent which takes no part in the reaction as, for instance, benzene, naphtha, glacial acetic acid or formic acid free from water. When free amino bases are used which react rather violently with the disulphurdichloride, the reaction should be restrained by adding such a suitable diluting agent.

It is essential for obtaining a favorable result that the temperature of the reaction is kept below the boiling point of the disulphurdichloride, that is, not above about 120° C. and preferably not below about 40° C., as at more elevated temperatures more complicated substances result which I do not claim and that at least 2 to 3 molecules of disulphurdichloride to 1 molecule of base or aminogroup respectively are used, according to the following general equations which represent the probable course of the reaction:

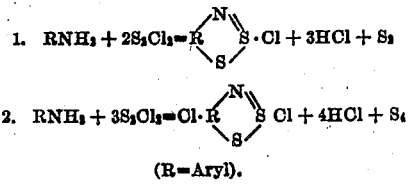

(R=Aryl).

Preferably an excess above these theoretical figures is employed say for 1 part of aminocompound, 4 to 10 parts of disulphurdichloride, or, calculated on molecular quantities, for one mol of the aminocompound or respectively one amino-group from about 4 to about 10 mols of disulphurdichloride, as then the yield in most cases is a quantitative one.

The process is illustrated by the following examples:

*Example I.*—100 kilos dry well ground anilinehydrochloride are heated in a suitable vessel fitted with a stirrer with five to ten times the quantity of disulphurdichloride ($S_2Cl_2$), that is, one mol of anilinehydrochloride to from 4.8 to 9.6 mols of disulphurdichloride, to 50°–70° C. until a test can no longer be diazotized and coupled. It is then diluted with an anhydrous, inert diluting agent, such as naphtha, benzene, ligroine, etc., the separating body is removed by suction, washed with one of the hydrocarbons mentioned, freed from any excess of sulphurchloride that may adhere to it, and dried, preferably in a vacuum at as low a temperature as possible. The yield is quantitative. When dried it is a yellow crystalline powder soluble with a yellowish brown color in water, insoluble in ether, benzene, carbonbisulphide and ligroine, etc., difficultly soluble in cold glacial acetic acid and yielding yellow crystalline needles when precipitated from these solutions with benzene or ether. With aniline oil the body at once reacts forming an intense bluish violet basic dyestuff. Bodies of quite similar properties are produced when using dry hydrochlorides of o-, p- and m-chloraniline, o- and m-toluidine, p-xylidine, etc.

*Example II.*—20 kilos aniline are mixed with the same volume of benzene, ligroine, or solvent naphtha and gradually added to a mixture of 120 kilos disulphurdichloride, that is, one mol of aniline to about 4 mols of disulphurdichloride and 600 kilos of one of the above mentioned hydrocarbons. The mixture becomes warm, and aniline hydrochloride and sulphur separate from the solution. The whole is then heated while stirring at 70° to 100° C. until a sample is no longer diazotizable. When cold, the separated yellowish brown substance is filtered and purified as described in Example I. It is identical with the substance produced according to Example I. In exactly the same manner the products of reaction of o- and m-toluidine and of analogous bases are obtained.

*Example III.*—20 kilos acetanilide are heated with 5 to 10 times their weight of disulphurdichloride, that is, one mol of acetanilide to from about 5 to 10 mols of disulphurdichloride, for 10 to 20 hours at 70° to 100° C. When the reaction is finished, the mass is diluted with a suitable dry hydrocarbon and the product of reaction is separated as described in Example I; it is identical in all of its properties with the product of reaction of disulphurdichloride on anilinehydrochloride.

*Example IV.*—20 kilos of hydrochloride, or sulphate, or oxalate of β-naphthylamine are mixed with 100 to 200 kilos of disulphurdichloride, that is, one mol of β-naphthylamine to from about 6.6 to about 13 mols of disulphurdichloride, and the mixture is warmed to 40° to 60° C. while stirring well until a test can no longer be diazotized. The new substance is isolated as described in Example I. In a dry state it forms an orange powder which dissolves in water with the same color. After a short time from such aqueous solution yellowish white leaflets crystallize out whereas the solution shows a strong acid reaction.

*Example V.*—25 kilos of o-anisidine are mixed with about 50 kilos glacial acetic acid and then very slowly added, while stirring and cooling well, to about 150 kilos disulphurdichloride, that is, one mol of o-anisidine to about 5.5 mols of disulphurdichloride; stirring is continued for some hours at ordinary temperature, then it is gradually warmed to 40° to 60° C. until a test can no longer be diazotized. The new substance, if isolated as described in the foregoing examples, is in a dry state a yellowish orange powder which dissolves with the same color in water. This aqueous solution is pretty stable, but after addition of some acetate of sodium or sodium carbonate it becomes colorless and white leaflets crystallize out.

*Example VI.*—10 kilos benzidine or the corresponding amount of benzidinehydrochloride are introduced in a mixture of 50 kilos glacial acetic acid and 50 to 80 kilos disulphurdichloride, that is, one mol of benzidine to form about 3.4 to about 5.5 mols of disulphurdichloride. The whole is heated while stirring for some hours from 90° to 120° C. until a test can no longer be diazotized. It is isolated as described above. In a dry state it is a dark violet crystalline powder soluble with a claret-red color in water. By warming this solution it becomes soon colorless and greenish white leaflets are precipitated. With aniline oil it produces a green unstable coloring.

I am aware that the following aminoarylthioglycolic acids are already described in literature:

(1) 1-amino-phenyl-2-thioglycolic acid (Unger and Graff, Ber. d. deutsch. Chem. Ges. vol. 30, page 2389).

(2) 1-amino-5-chlorophenyl-2-thioglycolic acid (German Patent No. 202,606).

(3) 1-aminonaphthalene-2-thioglycolic acid (Friedlander and Woroshzow, Liebigs Ann. vol. 388, page 1).

(4) 2-aminonaphthalene-1-thioglycolic acid (Friedlander and Woroshzow, Liebigs Ann. vol. 388, page 1).

Therefore I do not claim these aforesaid compounds as new products.

I claim:

1. Process for the manufacture of condensation products having the character of ortho-aminoarylthioglycolic acids and corresponding probably to the general formula:

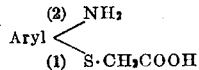

which process comprises treating the products obtained by allowing an excess over equimolecular proportions of disulphurdichloride to react with an aromatic amino-compound containing in its molecule at least one primary amino-group and one free ortho-position thereto, whereby there are formed compounds having most probably the general formula:

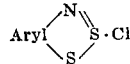

with water, splitting the ring by treatment with alkali and condensing with monochloracetic acid in alkaline solution.

2. Process for the manufacture of condensation products having the character of ortho-aminoarylthioglycolic acids and corresponding probably to the general formula:

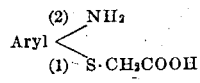

which process comprises treating compounds having probably the general formula:

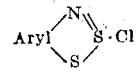

with water, splitting the ring by treatment with alkali and condensing with monochloracetic acid in alkaline solution.

In testimony whereof I affix my signature.

RICHARD HERZ.